L. C. WARNER.
Apparatus for Showing the Aeration of Water.

No. 221,433.    Patented Nov. 11, 1879.

WITNESSES:
Byron A. Tyler
George Rennett

INVENTOR.
Lucius C. Warner
Per E. O. Frink
his Attorney

UNITED STATES PATENT OFFICE.

LUCIUS C. WARNER, OF ALVIN, ILLINOIS, ASSIGNOR TO C. S. & L. C. WARNER, OF BROOKLYN, NEW YORK.

IMPROVEMENT IN APPARATUS FOR SHOWING THE AERATION OF WATER.

Specification forming part of Letters Patent No. 221,433, dated November 11, 1879; application filed November 11, 1878.

*To all whom it may concern:*

Be it known that I, LUCIUS C. WARNER, of Alvin, Vermillion county, State of Illinois, have invented a new and useful Apparatus for Showing the Aeration and Renovation of Water in Wells, Cisterns, &c., of which the following is a specification.

Prior to my invention there has been great difficulty in showing the manner in which still bodies of water contained in wells and cisterns are agitated and purified by combining oxygen with any organic impurities contained in the water.

The object of my invention is to provide a transparent apparatus which is designed to exhibit or display to the sight or view the manner in which water is agitated and renovated by the introduction of charges of air.

My invention consists of a transparent water-tight case, designed to represent a well-curb and cistern or well, by means of which the action of a water-elevator can be clearly seen, not only in the curb, but in the well or cistern below; also, the manner in which the water is agitated by the movement of the elevator-buckets; also, the manner in which pure air is carried and discharged into the water as the buckets descend, thereby showing the manner in which water is aerated and purified in wells and cisterns.

Figure 1:
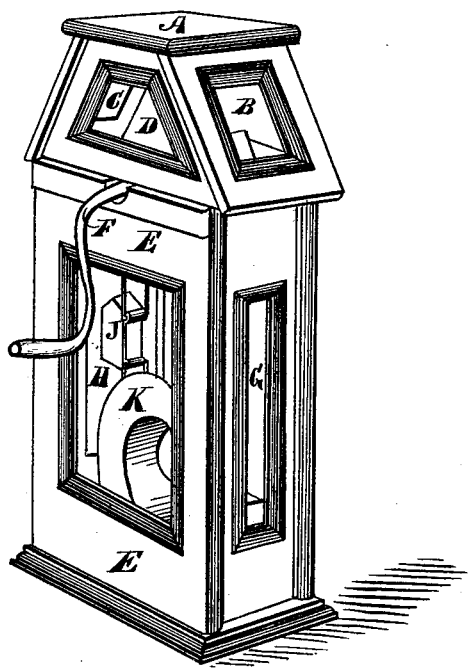
Figure 2:
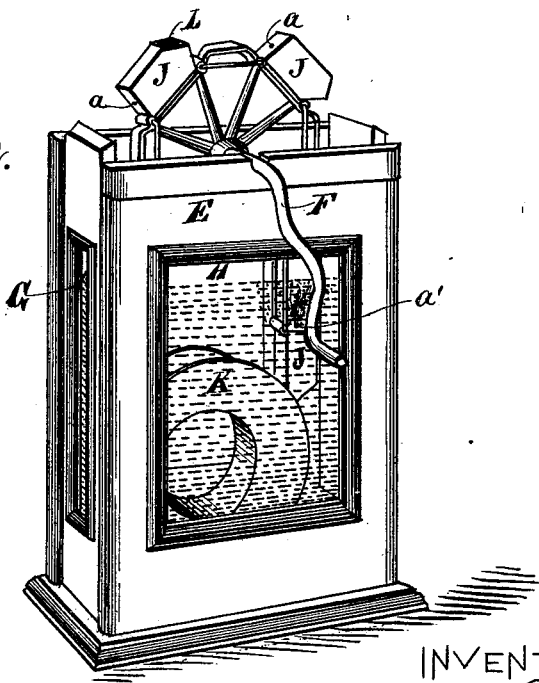

In the accompanying drawings, in which like letters of reference in the different figures indicate like parts, Figures 1 and 2 represent perspective views of the device embodying my invention.

The main tank or vessel E, which is designed to represent the curb as well as the cistern or well, is provided with transparent sides, front, and back, as shown at H and G, for the purpose of allowing rays of light to pass inside of the curb, so that the action of the air that is carried into the water by the buckets and the agitation of the water can be distinctly seen from the outside.

The cover A may also be provided with transparent sides, front, and back, as shown at B C D. The device for elevating, aerating, and agitating the water may be of any ordinary construction, and to which I make no broad claim, as various devices for that purpose are now in use. The one shown in the drawings represents a series of buckets, J, having an open mouth, L, and a perforated bottom, $a$, operated in the well or cistern by means of a wheel and crank, F. As the buckets descend into the water with the open end, L, downward, part of the air contained in each bucket escapes by a hole, $a$, in the bottom, and part by the mouth L when the bucket begins to ascend. The air bubbles up through the water, as shown at $a'$, Fig. 2, thus relieving the crank from pressure, and at the same time charges the water with air, thus purifying the water by combining the oxygen of the air with any organic impurities contained in the water, all of which can be distinctly seen by my new transparent tank from the outside.

What I claim as new, and desire to secure by Letters Patent, is—

An experimental pump-casing composed of glass and wood combined with a pump or endless water-elevator, adapted to hold a mimic well or cistern up to view, so that the process of aerating water may be illustrated and witnessed above ground, substantially as shown and described.

In testimony whereof I have signed my name to this specification in the presence of two subscribing witnesses.

LUCIUS C. WARNER.

Witnesses:
E. O. FRINK,
G. H. RENNETT.